US007520130B2

(12) United States Patent
Tanaka et al.

(10) Patent No.: US 7,520,130 B2
(45) Date of Patent: Apr. 21, 2009

(54) HYDRAULIC PRESSURE CONTROL DEVICE OF CONSTRUCTION MACHINE

(75) Inventors: Junsei Tanaka, Hirakata (JP); Kazuhiro Hatake, Hirakata (JP)

(73) Assignee: Komatsu Ltd., Tokyo (JP)

( * ) Notice: Subject to any disclaimer, the term of this patent is extended or adjusted under 35 U.S.C. 154(b) by 368 days.

(21) Appl. No.: 10/579,394

(22) PCT Filed: Nov. 12, 2004

(86) PCT No.: PCT/JP2004/016832

§ 371 (c)(1),
(2), (4) Date: May 15, 2006

(87) PCT Pub. No.: WO2005/047709

PCT Pub. Date: May 26, 2005

(65) Prior Publication Data

US 2007/0125078 A1 Jun. 7, 2007

(30) Foreign Application Priority Data

Nov. 14, 2003 (JP) ............................ 2003-385596

(51) Int. Cl.
*F16D 31/02* (2006.01)

(52) U.S. Cl. .......................................... 60/421; 60/429

(58) Field of Classification Search .................. 60/421, 60/422, 429, 430
See application file for complete search history.

(56) References Cited

U.S. PATENT DOCUMENTS

| | | | | |
|---|---|---|---|---|
| 4,461,148 | A | 7/1984 | Krusche | |
| 4,768,339 | A * | 9/1988 | Aoyagi et al. | 60/428 |
| 5,211,014 | A | 5/1993 | Kropp | |
| 6,170,261 | B1 * | 1/2001 | Ishizaki et al. | 60/421 |
| 6,276,133 | B1 * | 8/2001 | Yoshida et al. | 60/421 |

FOREIGN PATENT DOCUMENTS

| | | |
|---|---|---|
| JP | 57-116967 | 7/1982 |
| JP | 3-084204 | 4/1991 |
| JP | 4-019406 | 1/1992 |
| JP | 4-296205 | 10/1992 |
| JP | 6-123302 | 5/1994 |
| JP | 9-217705 | 8/1997 |
| JP | 10-082402 | 3/1998 |
| JP | 10-82403 | 3/1998 |
| JP | 11-218102 | 8/1999 |
| WO | 94/10455 | 5/1994 |
| WO | 98/41765 | 9/1998 |

* cited by examiner

*Primary Examiner*—Michael Leslie
(74) *Attorney, Agent, or Firm*—Wenderoth, Lind & Ponack, L.L.P.

(57) ABSTRACT

A hydraulic pressure control device of a construction machine enabling an increase in operability and working efficiency by suppressing a fluctuation in flow rates occurring before and after the switching of a merging-separating valve, in energy efficiency by accurately determining the switching timing of the merging-separating valve to suppress the pressure energy loss of a pressure compensating valve, and working efficiency in the compound motion of plural hydraulic actuators. When a controller determines that necessary flow rates of first and second hydraulic actuators are less than maximum discharge flow rate of each of first and second variable displacement hydraulic pumps when the first merging-separating valve is in a merging position, the switching of the first merging-separating valve is controlled so that firstly the first merging-separating valve is switched to a separating position and, after the switching is completed, the second merging-separating valve is switched.

9 Claims, 5 Drawing Sheets

HYDRAULIC PRESSURE CONTROL DEVICE OF CONSTRUCTION MACHINE

TECHNICAL FIELD

The present invention relates to a hydraulic pressure control device of a construction machine, and more particularly relates to a hydraulic pressure control device that switches a plurality of fluid discharge passages to the merge state or separation state in a hydraulic circuit in which pressure oil discharged from a plurality of hydraulic pumps is supplied to a plurality of hydraulic actuators via the plurality of fluid discharge passages and a plurality of main operation valves.

BACKGROUND ART

In a construction machine such as hydraulic pressure shovels, etc., a plurality of work devices and upper revolving bodies such as booms, arms, and buckets are provided, and these plurality of work devices and upper revolving bodies are variously driven and operated by corresponding a plurality of hydraulic actuators (hydraulic pressure cylinders, hydraulic pressure motors).

Normally, a plurality of (2 units) variable displacement hydraulic pumps, specifically first and second hydraulic pumps, are used as the drive source of these plurality of hydraulic actuators.

Pressure oil is supplied from the first hydraulic pump to a first main operation valve through a first discharge fluid passage, and the pressure oil that has passed through the first main operation valve is supplied to the first hydraulic actuator. Here, the first main operation valve is manipulated by an operation lever, for example, on the left side. The left operation lever is an operation lever that operates the action, for example, of an arm and an upper rotating body, and the first hydraulic actuator is a hydraulic actuator for a work device that operates the arm and the upper and rotating body. By manipulating the left operation lever, a direction and a flow rate of the pressure oil supplied from the first main operation valve to the first hydraulic actuator is changed, and the arm and the upper rotating body is operated in a direction and at a velocity corresponding to this.

Meanwhile, pressure oil is supplied from a second hydraulic pump to a second main operation valve though a second discharge fluid passage, and the pressure oil which has passed through the second main operation valve is supplied to a second hydraulic actuator. Here, the second main operation valve is manipulated, for example, by an operation lever on the right side. The right operation lever is an operation lever that manipulates, for example, the operation of a boom and a bucket, and the second hydraulic actuator is the hydraulic actuator for the work device that operates the boom and the bucket. By manipulating the right operation lever, a direction and a flow rate of the pressure oil supplied from the second main operation valve to the second hydraulic actuator is changed, and the boom and the bucket is operated in a direction and at a velocity corresponding to this.

Patent literatures 1, 2, and 3 described later are inventions in which the hydraulic pressure circuit of the construction machine is provided with a merging/separating valve which sets the first discharge fluid passage and the second discharge fluid passage in a connected state or a blocked state, and the merging/separating valve can be switched between the merge position and the separation position. When changing the merging/separating valve to the merge position, the first discharge fluid passage and the second discharge fluid passage are connected, and both discharge fluid passages enter the merge state; when changing the merging/separating valve to the separation position, the first discharge fluid passage and the second discharge fluid passage are blocked and enter the separation state.

With a construction machine, there are many opportunities to perform operations by simultaneously manipulating a left and right operation levers, driving the first and the second hydraulic actuators simultaneously, and thereby conducting complex operations of a plurality of work devices corresponding to the respective first and second hydraulic actuators.

Here, when simply merging the first discharge fluid passage and the second discharge fluid passage and simultaneously driving a plurality of hydraulic actuators, even if the left and right operation levers are manipulated only the same amount, the hydraulic actuator with the smaller load (for example, the first hydraulic actuator) is supplied at a large flow rate, the hydraulic actuator with the larger load (for example, the second hydraulic actuator) is supplied at a small flow rate, and there is loss of operability.

Then, every first and second main operation valves is provided with a first and second pressure compensation valve so that the flow rate corresponding to the amount of operation of the left and right operation levers is fed to the first and the second hydraulic actuators.

When changing the merging/separating valve to the merge position, pressure is compensated by the first and the second pressure compensation valves at the same time. Pressure is compensated by introducing into the first and the second pressure compensation valves the maximum load pressure, for example, P2, from among the load pressures P1 and P2 of the first and the second hydraulic actuators. In addition, when switching the merging/separating valve from the merge position to the separation position, the pressure compensation based on the first and the second pressure compensation valves is simultaneously released. The pressure compensation is released by introducing to the respective first and second pressure compensation valves the load pressure of the hydraulic actuator itself, rather than the maximum load pressure.

Letting the open area of the first and the second main operation valves be A1 and A2; the differential pressure before and after narrowing the first and the second main operation valves be ΔP1 and ΔP2; and the flow rate coefficient be c, the pressure oil flow rates Q1 and Q2 (L/min) supplied to the first and the second hydraulic actuators from the first and the second main operation valves are expressed in the following formulae (1) and (2):

$$Q1=c\cdot A1\cdot\sqrt{(\Delta P1)} \quad (1)$$

$$Q2=c\cdot A2\cdot\sqrt{(\Delta P2)} \quad (2)$$

When pressure compensation is performed, the differential pressure before and after narrowing the first main operation valve on the light load side, namely, ΔP1 of the right side of the aforementioned formula (1), is the same value as differential pressure before and after narrowing the second main operation valve on the heavy load side, ΔP2. For this reason, in the pressure compensation state, the relationship indicated in the following formula (3) is established.

$$Q1/Q2=A1/A2 \quad (3)$$

By compensating the pressure in this way, the differential pressures before and after narrowing the first and the second main operation valves have the same value, and the load has no effect. The flow rates Q1 and Q2, which are proportional to the degree of opening A1 and A2 of the first and the second main operation valves, namely, the amount of operation of the left and right operation levers, are supplied to the first and the second hydraulic actuators, and operability when performing complex operations of a plurality of work devices is improved.

(Prior Art 1)

As described above, the hydraulic pressure circuits in Patent literatures 1, 2, and 3 are configured such that pressure compensation by the first and the second pressure compensation valves is released at the same time as the merging/separating valves is switched from the merge position to the separation position, and on the other hand, pressure compensation by the first and the second pressure compensation valves is performed at the same time as the merging/separating valve is switched from the separation position to the merge position.

(Prior Art 2)

In Patent literatures 2 and 3, when the swash plate of one hydraulic pump of the first and the second hydraulic pumps reaches the maximum rotation, and the discharge pressure of the other hydraulic pump has become higher than the discharge pressure of the former hydraulic pump, the merging/separating valve is switched from the separation position to the merge position.

(Prior Art 3)

In Patent literature 3, the merging/separating valve is switched from the separation position to the merge position when a special hydraulic actuator is driven. For example, if one hydraulic pressure motor for traveling is operated, the valve is switched to the separation position, and if the hydraulic actuator for a work device is operated, the valve is switched to the merge position.

Patent literature 1: Japanese Patent Application Laid-open No. 9-217705

Patent literature 2: Japanese Patent Application Laid-open No. 10-82403

Patent literature 3: Japanese Patent Application Laid-open No. 11-218102

SUMMARY OF THE INVENTION

As explained in Prior Art 1, in the past, at the same time as the merging/separating valve is switched from the merge position to the separation position, pressure compensation is released by the first and the second pressure compensation valves; and at the same time as the merging/separating valve is switched from the separation position to the merge position, pressure compensation is performed by the first and the second pressure compensation valves.

However, when turning the pressure compensation ON and OFF at the same time as connecting with or blocking the first and the second discharge fluid passages in this way, fluctuations in the flow rates of the fluids that pass through the first and the second discharge fluid passages are produced before and after switching the merging/separating valve, operability is lost, and work efficiency decreases.

With the foregoing in view, an object of the present invention is to resolve a first problem, which is to improve operability and work efficiency by controlling flow rate fluctuations produced before and after switching the merging/separating valve.

In this regard, when performing pressure compensation with the merging/separating valve in the merge position, while using the pressure compensation valve (second pressure compensation valve) of the hydraulic actuator (for example, the second hydraulic actuator) side with the larger load, the flow passage is opened and the pressure oil easily flows from the main operation valve (second main operation valve) to the hydraulic actuator (second hydraulic actuator); and while using the pressure compensation valve (first pressure compensation valve) corresponding to the hydraulic actuator (first hydraulic actuator) with the smaller load, the flow passage is narrowed, making flow of the pressure oil more difficult from the main operation valve (first main operation valve) to the hydraulic actuator (first hydraulic actuator). For this reason, using the pressure compensation valve (first pressure compensation valve) of the small load side produces useless pressure loss and energy loss.

For this reason, from the perspective of preventing energy loss due to pressure loss, if the circumstances are such that pressure compensation need not be performed, it is necessary to switch the merging/separating valve from the merge position to the separation position as rapidly as possible. Meanwhile, from the perspective of improving the work efficiency when conducting complex operations with a plurality of work devices, it is necessary to rapidly switch the merging/separating valve from the separation position to the merge position at a suitable timing.

With the foregoing in view, an object of the present invention is to resolve a second problem, which is to improve energy efficiency, and to improve work efficiency when performing complex operations of a plurality of hydraulic actuators, by controlling energy loss due to pressure compensation valve pressure loss such that the switching periods of the merging/separating valve are correctly determined.

In addition, an object of the present invention is to resolve a third problem, which is to simultaneously resolve the first and the second problems.

Further, in Prior Art 2, the merging/separating valve switching time is determined due to the hydraulic pump swash plate rotational angle and discharge pressure, but the data obtained from the hydraulic pump are different than the flow rates that the first and the second hydraulic actuators of the present invention actually require. Moreover, in Prior Art 3, switching of the merging/separating valve is performed by having a specified hydraulic actuator operate, but this does not mean that switching of the merging/separating valve is performed upon deciding by how much flow rate the hydraulic actuator actually requires, as is done in the present invention.

A first aspect of the invention provides a hydraulic pressure control device of a construction machine, comprising:

first and second variable displacement hydraulic pumps, first and second hydraulic actuator driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate differential pressure before and after the first and the second main operation valves to a predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, and control means that controls a switching of the first and the second merging/separating valves such that, when it is determined that the first merging/separating valve and the second merging/separating valve are to be switched from the merge position to the separation position, an operation of a switching of the first merging/separating valve from the merge position to the separation position is performed initially, and after the switching of the first merging/separating valve has been completed, an operation to switch the second merging/separating valve from the merge position to the separation position is performed.

A second aspect of the invention provides a hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate differential pressure before and after the first and the second main operation valves to a predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means for determining whether each of the necessary flow rates of the first and the second hydraulic actuators calculated by the necessary flow rate calculation means is less than maximum discharge flow rate per pump of the first and the second variable displacement hydraulic pumps, and control means that controls a switching of the first and the second merging/separating valves such that, when the first merging/separating valve and the second merging/separating valve are in the merge position and the determination means determines that each of the necessary flow rates of the first and the second hydraulic actuators is less than the maximum discharge flow rate per pump of the first and the second variable displacement hydraulic pumps, an operation of a switching of the first merging/separating valve from the merge position to the separation position is performed initially, and after the switching of the first merging/separating valve has been completed, an operation to switch the second merging/separating valve from the merge position to the separation position is performed.

A third aspect of the invention provides a hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate differential pressure before and after the first and the second main operation valves to a predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means to determine whether each of the necessary flow rates of the first and the second hydraulic actuators calculated by the necessary flow rate calculation means is less than maximum discharge flow rate per pump of the first and the second variable displacement hydraulic pumps, and control means that controls a switching of the first merging/separating valve and the second merging/separating valve from the merge position to the separation position, when the first merging/separating valve and the second merging/separating valve are in the merge position and the determination means determines that each of the necessary flow rates of the first and the second hydraulic actuators is less than maximum discharge flow rate per pump of the first and the second variable displacement hydraulic pumps.

A fourth aspect of the invention provides the hydraulic pressure control device of a construction machine according to the first aspect of the invention, wherein the control means controls the switching of the first and the second merging/separating valves such that, when it is determined that the first merging/separating valve and the second merging/separating valve are to be switched from the separation position to the merge position, an operation of a switching of the second merging/separating valve from the separation position to the merge position is performed initially, and after the switching of the second merging/separating valve has been completed, an operation to switch the first merging/separating valve from the separation position to the merge position is performed.

A fifth aspect of the invention provides the hydraulic pressure control device of a construction machine according to the second aspect of the invention, wherein the control means controls the switching of the first and the second merging/separating valves such that, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps, an operation of a switching of the second merging/separating valve from the separation position to the merge position is performed initially, and after the switching of the second merging/separating valve has been completed, an operation to switch the first merging/separating valve from the separation position to the merge position is performed.

A sixth aspect of the invention provides the hydraulic pressure control device of a construction machine according to the third aspect of the invention, wherein the control means performs control to switch the first merging/separating valve and the second merging/separating valve from the separation position to the merge position, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps.

A seventh aspect of the invention provides a hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate differential pressure before and after the first and the second main operation valves to a predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, and control means that controls a switching of the first and the second merging/separating valves such that, when it is determined that the first merging/separating valve and the second merging/separating valve are to be switched from the separation position to the merge position, an operation of a switching of the second merging/separating valve from the separation position to the merge position is performed initially, and after the switching of the second merging/separating valve has been completed, an operation to switch the first merging/separating valve from the separation position to the merge position is performed.

An eighth aspect of the invention provides a hydraulic pressure control device of a construction machine, comprising:

first and second variable displacement hydraulic pumps, first and second hydraulic actuator driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate differential pressure before and after the first and the second main operation valves to a predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means for determining whether each of the necessary flow rates of the first and the second hydraulic actuators calculated by the necessary flow rate calculation means is less than maximum discharge flow rate per pump of the first and the second variable displacement hydraulic pumps, and control means that controls a switching of the first and the second merging/separating valves such that, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps, an operation of a switching of the second merging/separating valve from the separation position to the merge position is performed initially, and after the switching of the second merging/separating valve has been completed, an operation to switch the first merging/separating valve from the separation position to the merge position is performed.

A ninth aspect of the invention provides a hydraulic pressure control device of a construction machine, comprising:

first and second variable displacement hydraulic pumps, first and second hydraulic actuator driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate differential pressure before and after the first and the second main operation valves to a predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means to determine whether each of the necessary flow rates of the first and the second hydraulic actuators calculated by the necessary flow rate calculation means is less than maximum discharge flow rate per pump of the first and the second variable displacement hydraulic pumps, and control means that controls a switching of the first merging/separating valve and the second merging/separating valve from the separation position to the merge position, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps.

As indicated in FIGS. 1 and 2, according to the first invention, the switching of the first and the second merging/separating valves 13, 21 is controlled such that, when the controller 14 has decided to switch the first merging/separating valve 13 and second merging/separating valve 21 to the separation position B (determination of YES at S3), initially the operation to switch the first merging/separating valve 13 from the merge position A to the separation position B is performed (S4), and after switching of the first merging/separating valve 13 has been completed (determination of YES at S8), the operation to switch the second merging/separating valve 21 from the merge position A to the separation position B is performed (S9).

The present first invention thereby improves operability and work efficiency by suppressing flow rate fluctuations produced at first and second discharge fluid passages 10, 11 before and after switching the merging/separating valves 13, 21 because, when switching from the merge position A to the separation position B, after switching the first merging/separating valve 13 to the separation position B and blocking the first and the second discharge fluid passages 10, 11, the second merging/separating valve 21 is switched to the separation position B and the pressure compensation is turned OFF.

As indicated in FIGS. 1 and 2, according to the third invention, the operation to control switching of the first merging/separating valve 13 and the second merging/separating valve 21 from the merge position A to the separation position B (S4 to S10) is performed when the first merging/separating valve 13 and second merging/separating valve 21 are in the merge position A and the controller 14 has determined that the necessary flow rates Q1*d*, Q2*d* of the first and the second hydraulic actuators 4, 7 are less than the maximum discharge flow rate Qmax per pump of the first and the second variable displacement hydraulic pumps 2, 3 (determination of YES at S3).

The present third invention thereby improves energy efficiency and work efficiency when performing complex operations of a plurality of work devices (a plurality of hydraulic actuators 4, 7) by correctly determining the time for switching the first and the second merging/separating valves 13, 21 to the separation position and controlling energy loss due to pressure loss of the pressure compensation valves 6, 9 because the decision to switch to the separation position is made when calculating the necessary flow rates Q1*d*, Q2*d* of the first and the second hydraulic actuators 4, 7 and determining that the necessary flow rates Q1*d*, Q2*d* are less than the maximum discharge flow rate Qmax per pump of the first and the second hydraulic pumps 2, 3.

As indicated in FIGS. 1 and 2, according to the second invention, the first and the second merging/separating valves 13, 21 are controlled such that, when the first merging/separating valve 13 and second merging/separating valve 21 are in the merge position A and controller 14 has determined that the necessary flow rates Q1*d*, Q2*d* of the first and the second hydraulic actuators 4, 7 are less than the maximum discharge flow rate Qmax per pump of the first and the second variable displacement hydraulic pumps 2, 3 (determination of YES at S3), initially the operation to switch the first merging/separating valve 13 from the merge position A to the separation position B is performed (S4), and after switching of the first merging/separating valve 13 has been completed (determination of YES at S8), the operation to switch the second merging/separating valve 21 from the merge position A to the separation position B is performed (S9).

The present second invention is an invention that combines the first invention and the third invention, and has the effects of the first invention and the effects of the second invention.

In the fourth invention according to the first invention, the controller 14 further controls the switching of the first and the second merging/separating valves 13, 21 such that, when deciding to switch the first merging/separating valve 13 and the second merging/separating valve 21 from the separation position B to the merge position A (determination of NO at S3), initially the operation to switch the second merging/separating valve 21 from the separation position B to the merge position A is performed (S11), and after switching of the second merging/separating valve 21 has been completed (determination of YES at S12), the operation to switch the first merging/separating valve 13 from the separation position B to the merge position A is performed (S13).

The present fourth invention thereby improves operability and work efficiency by suppressing flow rate fluctuations produced at first and second discharge fluid passages 10, 11 before and after switching not only when switching to the separation position as in the first invention, but also when switching to the merge position because, when switching from the separation position B to the merge position A, after switching the first merging/separating valve 13 to the merge position A and the pressure compensation is turned ON, the second merging/separating valve 21 is switched to the merge position A and the first and the second discharge fluid passages 10, 11 are connected.

In the sixth invention according to the third invention, control to switch the first merging/separating valve 13 and second merging/separating valve 21 from the separation position B to the merge position A (S11 to S14) is performed when the first merging/separating valve 13 and second merging/separating valve 21 are in the separation position B and the controller 14 determines that at least one of the necessary flow rates Q1*d*, Q2*d* of the first and the second hydraulic actuators 4, 7 is the maximum discharge flow rate Qmax or more per pump of the first and the second variable displacement hydraulic pumps 2, 3 (determination of NO at S3).

The present sixth invention thereby improves energy efficiency and work efficiency when performing complex operations of a plurality of work devices (a plurality of hydraulic actuators 4, 7) by correctly determining not only the time for switching to the separation position as in the third invention, but also the time for switching to the merge position, and by controlling energy loss due to pressure loss of the pressure compensation valves 6, 9 because the decision to switch to the merge position is made when calculating the necessary flow rates Q1*d*, Q2*d* of the first and the second hydraulic actuators 4, 7 and determining that at least one of the necessary flow rates Q1*d*, Q2*d* is the maximum discharge flow rate Qmax or more per pump of the first and the second hydraulic pumps 2, 3.

In the fifth invention according to the second invention, control to switch the first and the second merging/separating valves 13, 21 is further performed such that, when the first merging/separating valve 13 and second merging/separating valve 21 are in the separation position B and the controller 14 determines that at least one of the necessary flow rates Q1*d*, Q2*d* of the first and the second hydraulic actuators 4, 7 is the maximum discharge flow rate Qmax or more per pump of the first and the second variable displacement hydraulic pumps 2, 3 (determination of NO at S3), initially the operation to switch the second merging/separating valve 21 from the separation position B to the merge position A is performed (S11), and after switching of the second merging/separating valve 21 has been completed (determination of YES at S12), the operation to switch the first merging/separating valve 13 from the separation position B to the merge position A is performed.

The present fifth invention is an invention that combines the fourth invention and the sixth invention, and has the effects of the fourth invention and the effects of the sixth invention.

As indicated in FIGS. 1 and 2, according to the seventh invention, the switching of the first and the second merging/separating valves 13, 21 is controlled such that, when the controller 14 has decided to switch the first merging/separating valve 13 and second merging/separating valve 21 from the separation position B to the merge position A (determination of NO at S3), initially the operation to switch the second merging/separating valve 21 from the separation position B to the merge position A is performed (S11), and after switching of the second merging/separating valve 21 has been completed (determination of YES at S12), the operation to switch the first merging/separating valve 13 from the separation position B the to merge position A is performed (S13).

The present seventh invention thereby improves operability and work efficiency by suppressing flow rate fluctuations produced at first and second discharge fluid passages 10, 11 before and after switching to the merge position because, when switching from the separation position B to the merge position A, after switching the second merging/separating valve 21 to the merge position A and the pressure compensation is turned ON, the first merging/separating valve 13 is switched to the merge position A and the first and the second discharge fluid passages 10, 11 are connected.

As indicated in FIGS. 1 and 2, according to the ninth invention, the switching of the first merging/separating valve 13 and the second merging/separating valve 21 from the separation position B to the merge position A (S11 to S14) is performed when the first merging/separating valve 13 and second merging/separating valve 21 are in the separation position B and the controller 14 has determined that at least one of the necessary flow rates Q1*d*, Q2*d* of the first and the second hydraulic actuators 4, 7 is the maximum discharge flow rate Qmax or more per pump of the first and the second variable displacement hydraulic pumps 2, 3 (determination of NO at S3).

The present ninth invention thereby improves energy efficiency and work efficiency when performing complex operations of a plurality of work devices (a plurality of hydraulic actuators 4, 7) by correctly determining the time for switching the first and the second merging/separating valves 13, 21 to the merge position and by controlling energy loss due to pressure loss of the pressure compensation valves 6, 9 because the decision to switch to the merge position is made when calculating the necessary flow rates Q1*d*, Q2*d* of the first and the second hydraulic actuators 4, 7 and determining that at least one of the necessary flow rates Q1*d*, Q2*d* is the maximum discharge flow rate Qmax or more per pump of the first and the second hydraulic pumps 2, 3.

As indicated in FIGS. 1 and 2, according to the eighth invention, the switching of the first and the second merging/separating valves 13, 21 is controlled such that, when the first merging/separating valve 13 and second merging/separating valve 21 are in the separation position B and controller 14 has determined that at least one of the necessary flow rates Q1*d*, Q2*d* of the first and the second hydraulic actuators 4, 7 is the maximum discharge flow rate Qmax or more per pump of the first and the second variable displacement hydraulic pumps 2, 3 (determination of NO at S3), the operation to switch the second merging/separating valve 21 from the separation position B to the merge position A is performed initially (S11), and after switching of the second merging/separating valve 21 has been completed (determination of YES at S12), the operation to switch the first merging/separating valve 13 from the separation position B to the merge position A is performed (S13).

The present eighth invention is an invention that combines the seventh invention and the ninth invention, and has the effects of the seventh invention and the effects of the ninth invention.

DETAILED DESCRIPTION OF PREFERRED EMBODIMENTS

Embodiments of a hydraulic pressure control device of a construction machine according to the present invention will be described with reference to the accompanying drawings.

Figure 1:
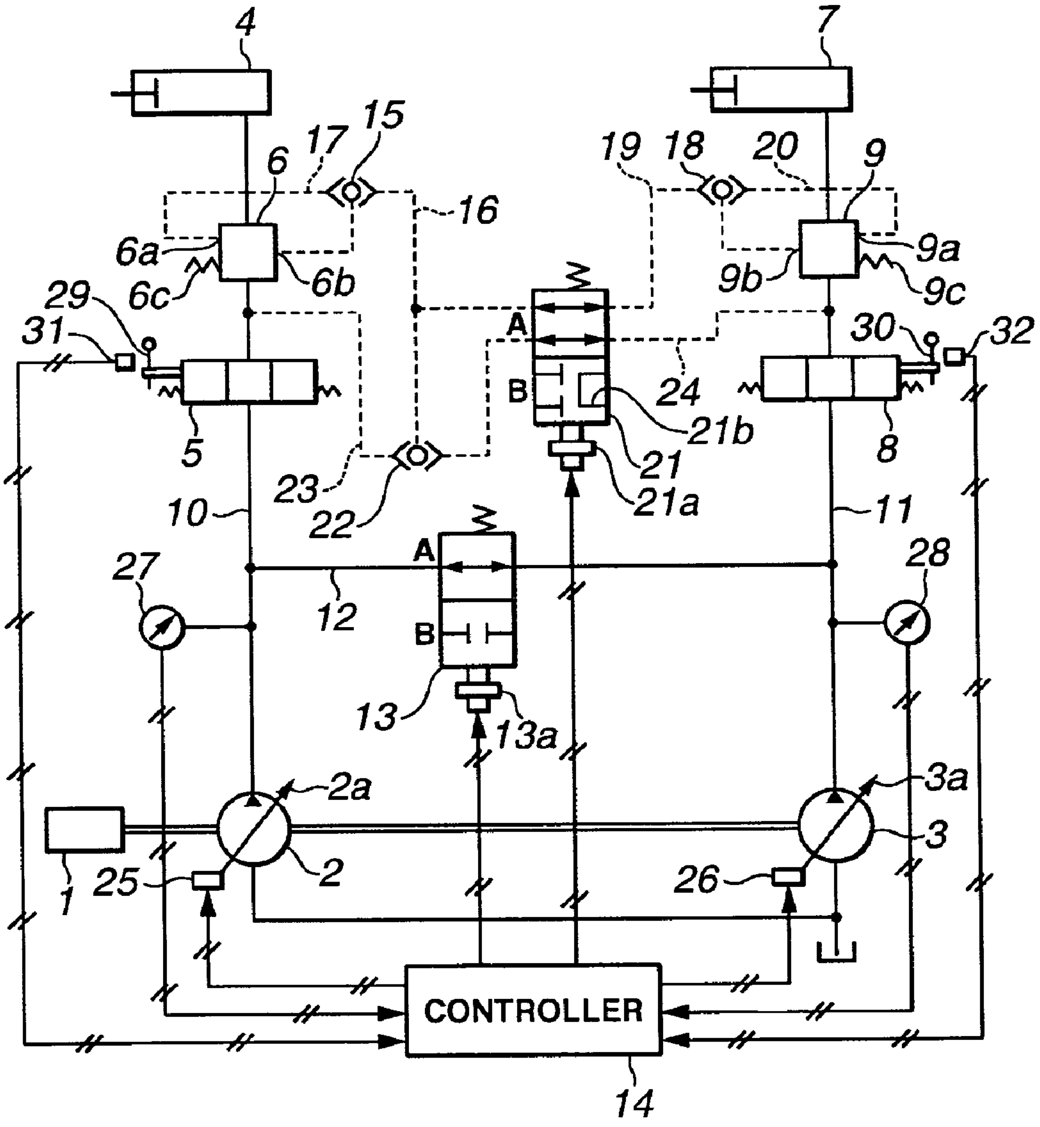
FIG. 1 is a hydraulic circuit diagram indicating an embodiment of the hydraulic pressure control device of a construction machine related to the present invention.

FIG. 1 is a hydraulic circuit diagram indicating an embodiment of the hydraulic pressure control device of a construction machine related to the present invention. FIG. 1 indicates a hydraulic circuit mounted in a hydraulic pressure shovel.

The shovel is provided with a plurality of work devices such as a boom, an arm and a bucket, etc. and an upper rotating body, and these plurality of work devices and the upper rotating body are respectively operated by corresponding first hydraulic actuator 4 for a work device and second hydraulic actuator 7 for a work device. The first hydraulic actuator 4 and the second hydraulic actuator 7 are configured by a hydraulic pressure cylinder or a hydraulic pressure motor, but for the sake of an explanation, are indicated by hydraulic pressure cylinders in FIG. 1. Moreover, in actual hydraulic pressure shovels, the hydraulic actuators are provided in each work device and upper rotating body, but for the sake of explanation, in the present embodiment, the first hydraulic actuator 4 is provided corresponding to the arm and the upper rotating body, and the second hydraulic actuator 7 is provided corresponding to the boom and the bucket.

These first and second hydraulic actuators 4, 7 are driven by using two variable displacement hydraulic pumps as the drive sources, namely, a first hydraulic pump 2 and a second hydraulic pump 3.

The first and the second hydraulic pumps 2, 3 are driven by an engine 1.

A swash plate 2*a* of the first hydraulic pump 2 is driven by a servo mechanism 25. The servo mechanism 25 is operated in response to control signals (electric signals), and the swash plate 2*a* of the first hydraulic pump 2 changes position in response to the control signals. The capacity (cc/rev) of the first hydraulic pump 2 is varied by changing the rotational position of the swash plate 2*a* of the first hydraulic pump 2. In the same way, a swash plate 3*a* of the second hydraulic pump 3 is driven by a servo mechanism 26. The capacity (cc/rev) of the second hydraulic pump 3 is varied by changing the rotational position of the swash plate 3*a* of the second hydraulic pump 3. When the swash plate 2*a* of the first hydraulic pump 2 is at the maximum rotation position (maximum capacity) and a speed of the engine 1 is at the maximum speed, pressure oil of the maximum discharge flow rate Qmax is supplied from the discharge outlet of the first hydraulic pump 2. In the same way, when the swash plate 3*a* of the second hydraulic pump 3 is at the maximum rotation position (maximum capacity) and a speed of the engine 1 is at the maximum speed, pressure oil of the maximum discharge flow rate Qmax is supplied from the discharge outlet of the second hydraulic pump 3. In the present DESCRIPTION, this maximum discharge flow rate Qmax (L/min) is defined as the "maximum discharge flow rate per pump".

The discharge outlet of the first hydraulic pump 2 is connected to the inlet port of a first main operation valve 5 through a first discharge fluid passage 10. The outlet port of a first main operation valve 5 is connected to the hydraulic chamber of the first hydraulic actuator 4.

Pressure oil discharged from the first hydraulic pump 2 is supplied to the first main operation valve 5 through the first discharge fluid passage 10, and the pressure oil that has passed through the first main operation valve 5 is supplied to the first hydraulic actuator 4.

The first main operation valve 5 is manipulated, for example, by a left operation lever 29 provided on the left side of the operating cab. The left operation lever 29 is an operation lever to manipulate the operation of the arm and the upper rotating body. By manipulating the left operation lever 29, a direction and a flow rate of the pressure oil supplied from the first main operation valve 5 to the first hydraulic actuator 4 is varied, and the arm and the upper rotational body are operated at a direction and a speed corresponding thereto.

Meanwhile, the discharge outlet of the second hydraulic pump 3 is connected to the inlet port of a second main operation valve 8 through the second discharge fluid passage 11. The discharge outlet of the second main operation valve 8 is connected to the hydraulic chamber of the second hydraulic actuator 7.

The pressure oil discharged from the second hydraulic pump 3 is supplied to the second main operation valve 8 through the second discharge fluid passage 11, and the pressure oil that has passed through the second main operation valve 8 is supplied to the second hydraulic actuator 7.

The second main operation valve 8 is manipulated, for example, by a right operation lever 30 provided on the right side of the operating cab. The right operation lever 30 is an operation lever to manipulate the operation of the boom and the bucket. By manipulating the right operation lever 30, a direction and a flow rate of the pressure oil supplied from the second main operation valve 8 to the second hydraulic actuator 7 is varied, and the boom and the bucket are operated at a direction and a speed corresponding thereto.

The first discharge fluid passage 10 and second discharge fluid passage 11 are connected by a connection fluid passage (merge fluid passage) 12. The first merging/separating valve 13 is provided on the connection fluid passage 12. The first merging/separating valve 13 is a switching valve having a merge position A that opens the connection fluid passage 12 and connects between the first discharge fluid passage 10 and the second discharge fluid passage 11, and a separation position B that closes the connection fluid passage 12 and blocks between the first discharge fluid passage 10 and the second discharge fluid passage 11. The switching operation of the first merging/separating valve 13 corresponds to control signals applied to an additionally provided electromagnetic solenoid 13*a*.

A first pressure compensation valve 6, which compensates a differential pressure before and after the narrowing of the first main operation valve 5 to a specified value, is provided for the first main operation valve 5.

Meanwhile, a second pressure compensation valve 9, which compensates a differential pressure before and after the narrowing of the second main operation valve 8 to a specified value, is provided for the second main operation valve 8.

The first pressure compensation valve 6 comprises: a first pressure receiving unit 6*a*, to which the outlet port side pressure of the first pressure compensation valve 6, namely, the maintenance pressure of the first hydraulic actuator 4, is supplied; a second pressure receiving unit 6*b*, to which the pilot pressure of the outlet port side of a shuttle valve 15 is supplied; and a spring 6*c* that is provided for the first pressure receiving unit 6*a* side.

One of the inlet ports of the shuttle valve 15 is connected to the outlet port of the first pressure compensation valve 6 through a maintenance pressure introduction fluid passage 17, and the other inlet port of the shuttle valve 15 is connected to the outlet port of the shuttle valve 22 through a first load pressure introduction fluid passage 16.

Meanwhile, the second pressure compensation valve 9 comprises: a first pressure receiving unit 9*a*, to which the outlet port side pressure of the second pressure compensation valve 9, namely, the maintenance pressure of the second hydraulic actuator 7, is supplied; a second pressure receiving unit 9*b*, to which the pilot pressure of the outlet port side of a shuttle valve 18 is supplied; and a spring 9*c* that is provided for the first pressure receiving unit 9*a* side.

One of the inlet ports of the shuttle valve 18 is connected to the outlet port of the second pressure compensation valve 9 through a maintenance pressure introduction fluid passage 20, and the other inlet port of the shuttle valve 18 is connected to a second load pressure introduction fluid passage 19.

The shuttle valve 22 is a valve that detects the pressure of the high pressure side, that is, the maximum load pressure, between P1, which is the load pressure of the first hydraulic actuator 4, namely, the pressure of the outlet port side of the first main operation valve 5, and P2, which is the load pressure of the second hydraulic actuator 7, namely, the pressure of the outlet port side of the second main operation valve 8; and that outputs the maximum load pressure to the first and the second load pressure introduction fluid passages 16 and 19. The first load pressure introduction fluid passage 16 is connected to the second load pressure introduction fluid passage 19 through the second merging/separating valve 21.

One of the inlet ports of the shuttle valve 22 is connected to the outlet port of the first main operation valve 5 through a load pressure introduction fluid passage 23, and the other inlet port of the shuttle valve 22 is connected to a load pressure introduction fluid passage 24 through the second merging/separating valve 21.

The second merging/separating valve 21 is a switching valve that has a merge position A that introduces pilot pressure oil of the maximum load pressure detected by the shuttle valve 22 to the first and the second load pressure introduction fluid passages 16, 19, and a separation position B that introduces load pressures P1, P2 of the first and the second hydraulic actuators respectively to the corresponding first and second load pressure introduction fluid passages 16, 19. The second merging/separating valve 21 performs switching operations corresponding to control signals applied to an additionally provided electromagnetic solenoid 21*a*.

A pressure sensor 27 that detects the pressure P1*p* of the pressure oil flowing through the first discharge fluid passage 10 is provided on the first discharge fluid passage 10. Likewise, a pressure sensor 28 that detects the pressure P2*p* of the pressure oil flowing through the second discharge fluid passage 11 is provided on the second discharge fluid passage 11.

The detection signals of the pressure sensors 27, 28 are input to the controller 14. Moreover, the operation amounts S1, S2 of the left and right operation levers 29, 30 are detected by the operation amount detection sensors 31, 32, and signals indicating the operation amounts S1, S2 are input to the controller 14.

Based on the input signals, the controller 14, as will be described later, creates control signals that should be output to the electromagnetic solenoids 13*a*, 21*a* of the first merging/separating valve 13 and second merging/separating valve 21, and the switching of the first merging/separating valve 13 and second merging/separating valve 21 are controlled by outputting these control signals. In addition, as will be described later, the controller 14 creates control signals that should be output to the servo mechanisms 25, 26 based on the input signals, and controls the rotational positions of the swash plates 2*a*, 3*a* of the first and the second hydraulic pumps 2, 3 when controlling the switching of the fist merging/separating valve 13.

Although not indicated in FIG. 1, it is assumed that, except when the above switching control is conducted, controls of the rotational positions of the swash plates 2*a*, 3*a* of the first and the second hydraulic pumps 2, 3 are performed by load sensing control.

Specifically, for example, the load pressure (provisionally called PL) introduced to the first load pressure introduction fluid passage 16 is applied to the servo mechanism 25 of the first hydraulic pump 2, and the pressure (provisionally called Pp) of the pressure oil flowing through the first discharge fluid passage 10 is applied to the servo mechanism 25 of the first hydraulic pump 2.

Here, the pressure difference Pp−PL is the differential pressure ΔP1 before and after narrowing of the first main operation valve 5. The rotational position of the swash plate 2*a* of the first hydraulic pump 2 is controlled at the servo mechanism 25 such that the differential pressure ΔP1 before and after narrowing of the first main operation valve 5 (=Pp−PL) becomes a constant differential pressure.

In the aforementioned formula (1) ($Q1=c\cdot A1\cdot\sqrt{(\Delta P1)}$), because the differential pressure ΔP1 before and after narrowing of the first main operation valve 5 (=Pp−PL) is constant, irrespective of the size of the load on the first hydraulic actuator 4, the flow rate Q1 proportional to the degree of opening A1 of the first main operation valve 5, specifically, to the operation amount S1 of the operation lever 29, can be supplied to the hydraulic actuator 4, and operability is improved.

Load sensing of the second hydraulic pump 3 side is controlled in the same way, wherein the load pressure (PL) introduced to the second load pressure introduction fluid passage 16 is applied to the servo mechanism 26 of the second hydraulic pump 3, and the pressure (Pp) of the pressure oil that flows through the second discharge fluid passage 11 is applied to the servo mechanism 26 of the second hydraulic pump 3.

Moreover, in a hydraulic pressure shovel, in addition to the left and right operation levers 29, 30 for the work devices, left and right traveling operation levers (or operation pedals), which manipulate the operations for the lower traveling unit, are provided in the operating cab.

The lower traveling unit of the hydraulic pressure shovel is configured by left and right crawler track, and left and right drive sprockets, etc., and the lower traveling unit is operated by using left and right traveling hydraulic pressure motors provided on the left and the right of the chassis and driven by left and right drive sprockets.

The left hydraulic pressure motor is equivalent to the first hydraulic actuator 4, and is driven by pressure oil supplied through the first discharge fluid passage 10. A left traveling operation valve equivalent to the first main operation valve 5 is provided; and the direction and the flow rate of the pressure oil supplied from the left traveling operation valve to the left traveling hydraulic pressure motor is varied by manipulating the left traveling operation lever, and the left drive sprocket and the left crawler track are operated in the direction and at the speed corresponding thereto.

Meanwhile, the right hydraulic pressure motor is equivalent to the second hydraulic actuator 7, and is driven by pressure oil supplied through the second discharge fluid passage 11. A right traveling operation valve equivalent to the second main operation valve 8 is provided; and the direction and the flow rate of the pressure oil supplied from the right traveling operation valve to the right traveling hydraulic pressure motor is varied by manipulating the right traveling operation lever, and the right drive sprocket and the right crawler track are operated in the direction and at the speed corresponding thereto.

Next, the details of the processing performed by the controller 14 will be explained by referring to the flow chart of FIG. 2 and the time charts of FIGS. 3A and 3B. FIG. 3A indicates a time chart of the switching operation of the second merging/separating valve 21, and FIG. 3B indicates a time chart of the switching operation of the first merging/separating valve 13.

When the operator manipulates the key switch to the engine start position, electric voltage is supplied to the controller 14 from the power source, the controller 14 is activated, and the engine 1 is started. In conjunction with this, the processing in FIG. 2 is started with controller 14. In the initial phase when activating the controller 14, control signals are output by the electromagnetic solenoids 13*a* and 21*a* in order for both the first merging/separating valve 13 and the second merging/separating valve 21 to be positioned at the merge position A.

When the second merging/separating valve 21 is positioned at the merge position A, pressure compensation is performed.

If the second merging/separating valve 21 is positioned at the merge position A, the first load pressure introduction fluid passage 16 and the second load pressure introduction fluid passage 19 are connected, and the load pressure introduction fluid passage 24 is connected to the inlet port of the shuttle valve 22. Here, if the load pressure P2, which is the outlet port side pressure of the second main operation valve 8, is higher than the load pressure P1, which is the outlet port side pressure of the first main operation valve 5, the maximum load pressure P2 is introduced from the load pressure introduction fluid passage 24 to the load pressure introduction fluid passage 16 through the shuttle valve 22. The maximum load pressure P2 is thereby applied to the second receiving pressure unit 6*b* of the first pressure compensation valve 6 through the first load pressure introduction fluid passage 16 and the shuttle valve 15. As a result, the load pressure of the outlet port side of the first main operation valve 5 changes from its own load pressure P1 up to the maximum load pressure P2.

Meanwhile, the maximum load pressure P2 is introduced to the second load pressure introduction fluid passage 19 from the load pressure introduction fluid passage 24 through the shuttle valve 22 and the first load pressure introduction fluid passage 16. The maximum load pressure P2 is thereby applied to the second receiving pressure unit 9*b* of the second pressure compensation valve 9 through the second load pressure introduction fluid passage 19 and the shuttle valve 18. As a result, the load pressure of the outlet port side of the second main operation valve 8 maintains its own load pressure P2 (maximum load pressure).

Letting the open area of the first and the second main operation valves be A1 and A2; the differential pressure before and after narrowing the first and the second main operation valves be ΔP1 and ΔP2; and the flow rate coefficient be c, the pressure oil flow rates Q1 and Q2 (L/min) supplied to the first and the second hydraulic actuators 4, 7 from the first and the second main operation valves 5, 8 are expressed in the following formulae (1) and (2):

$$Q1 = c \cdot A1 \cdot \surd(\Delta P1) \tag{1}$$

$$Q2 = c \cdot A2 \cdot \surd(\Delta P2) \tag{2}$$

When pressure compensation is performed, the differential pressure before and after narrowing the first main operation valve 5 on the light load side, namely, ΔP1 of the right side of the aforementioned formula (1), is the same value as differential pressure before and after narrowing the second main operation valve 8 on the heavy load side, ΔP2. For this reason, in the pressure compensation state, the relationship indicated in the following formula (3) is established.

$$Q1/Q2 = A1/A2 \tag{3}$$

By compensating the pressure in this way, the differential pressures before and after narrowing the first and the second main operation valves 5, 8 have the same value, and the load has no effect. The flow rates Q1 and Q2, which are proportional to the degree of opening A1 and A2 of the first and the second main operation valves 5, 8, namely, the amount of operation of the left and the right operation levers, are supplied to the first and the second hydraulic actuators 4, 7, and operability when performing complex operations of a plurality of work devices is improved.

As described above, in the initial phase, it is determined (S1) in the merge state whether the left and the right traveling operation levers are in the central position (OFF) or have been manipulated (ON).

If the left and the right traveling operation levers have been manipulated (determination of NO at S1), the traveling logic indicated in S21, S22, and S23 is executed, and the control related to the present invention (S3 to S14) is not executed.

In the traveling logic, it is first determined (S21) whether the work device operation levers 29, 30 are in the central position (OFF), or have been manipulated (ON).

If determined that the work device operation levers 29, 30 are in the central position (determination of YES at S21), the lower traveling unit may be operated without operating the work devices, and therefore operation of the left and the right crawler track of the lower traveling unit are operated in the separation state. Specifically, both the first merging/separating valve 13 and the second merging/separating valve 21 are switched from the merge position A to the separation position B. The reason the lower traveling unit is, by definition, operated in the separation state when operated independently is because of securing operability when conducting steering operations. If steering were cut when entering the merge state, pressure compensation would be conducted, and pressure oil would flow more readily to the traveling hydraulic pressure motor with the lighter load (for example, the left traveling hydraulic pressure motor), and operability when conducting steering operations would worsen, and this situation is to be avoided (S22).

Meanwhile, if determined that the work device operation levers 29, 30 have been manipulated, (determination of NO at S21), complex operations of the work devices and lower traveling unit have been conducted, the first merging/separating valve 13 and the second merging/separating valve 21 are kept in the merge position A, and the merge state is left as is (S23).

If the left and the right traveling operation levers are in the central position (determination of YES at S1), next, it is then determined (S2) whether the work device operation levers 29, 30 are manipulated (ON) or not (OFF).

If determined (determination of NO at S2) that the work device operation levers 29, 30 have not been manipulated (in the central position), processing returns to S1. But if determined that either of the work device operation levers 29, 30 has been manipulated (determination of YES at S2), processing moves to S3.

At S3, the necessary flow rates Q1*d*, Q2*d* (L/min) that should be supplied to the first and the second hydraulic actuators 4, 7 are calculated based on the operation amounts S1, S2 of the left and the right operation levers 29, 30.

As clarified by formula (3) above (Q1/Q2=A1/A2), the flow rates Q1, Q2 supplied to the first and the second hydraulic actuators 4, 7 in the merge state by pressure compensation are stipulated corresponding to the degrees of opening A1, A2 of the first and the second main operation valves 5, 8. Consequently, the necessary flow rates Q1*d*, Q2*d* that should be supplied to the first and the second hydraulic actuators 4, 7 can be derived based on the operation amounts S1, S2 of the left and the right operation levers 29, 30 (degrees of opening A1, A2 of the first and the second main operation valves 5, 8).

Figure 5:
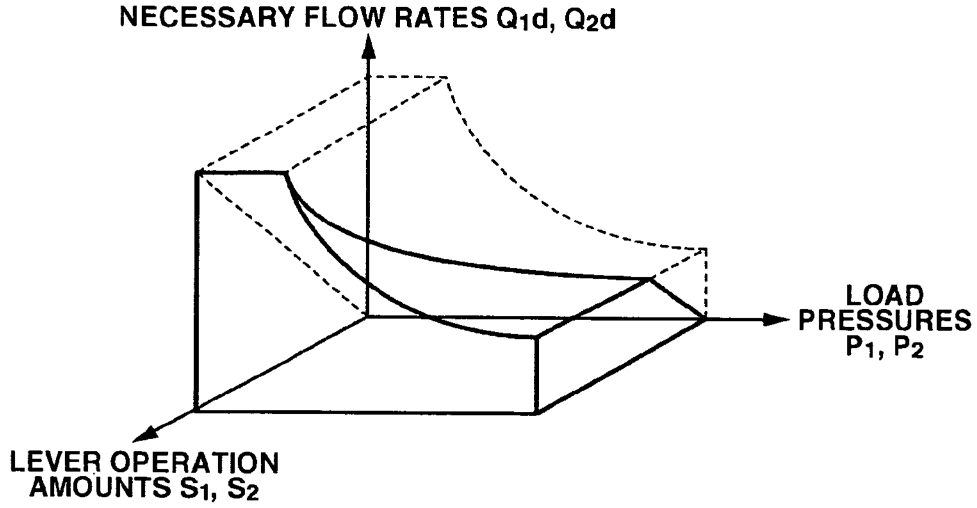
FIG. 5 is a diagram indicating the corresponding relationship for calculating the necessary flow rates of the first and the second hydraulic actuators.

FIG. 5 is a diagram to explain another method of calculating the necessary flow rates Q1*d*, Q2*d*.

In this case, as indicated in the same FIG. 5, the correlative relationship between the load pressure P1 of the first hydraulic actuator 4, the operation amount S1 of the operation lever 29, and the necessary flow rate Q1*d* of the first hydraulic actuator 4 is memorized in advance. Then, the load pressure P1 of the first hydraulic actuator 4 is detected, and the necessary flow rate Q1*d* of the first hydraulic actuator 4 is calculated following the correlative relationship indicated in FIG. 5 based on this detected load pressure P1 and the detected lever operation amount S1. In the same way, the load pressure P2 of the second hydraulic actuator 7 is detected, and the necessary flow rate Q2*d* of the second hydraulic actuator 7 is calculated following the correlative relationship indicated in FIG. 5 based on the detected load pressure P2 and the lever operation amount S2.

It is determined (S3) whether or not both necessary flow rates Q1*d*, Q2*d* of the first and the second hydraulic actuators 4, 7 calculated as described above are less than the maximum discharge flow rate Qmax per pump of the first and the second pumps 2, 3.

If determined (determination of YES at S3) that both necessary flow rates Q1*d*, Q2*d* of the first and the second hydraulic actuators 4, 7 are less than the maximum discharge flow rate Qmax per pump of the first and the second pumps 2, 3, then the merge state should be changed to the separation state, and processing moves to S4. Specifically, if both necessary flow rates Q1*d*, Q2*d* of the first and the second hydraulic actuators are less than the maximum discharge flow rate Qmax per pump of the first and the second pumps 2, 3, the maximum discharge flow rate of one corresponding hydraulic pump is enough for the flow rate to be supplied to the hydraulic actuators 4, 7, sufficient operational speed for the first and the second hydraulic actuators 4, 7 can be secured in the separation state, and this will not provoke a drop in efficiency. Moreover, in terms of energy efficiency, the separation state is preferable to provoking pressure loss by operating pressure compensation functions in the merge state. Thus, pressure loss caused by conducing pressure compensation in the merge state and the energy loss based thereon should be avoided, and the separation state is immediately entered even during operations.

The situation of changing from the merge state to the separation state in this way may occur, for example, when conducting complex operations of the arm and the bucket. If conducting complex operations of the arm and the bucket, not only when there is a small amount of lever operation, but also when conducting excavation operations with the operation levers 29, 30 at the maximum stroke position, if the load pressure is high, both necessary flow rates Q1*d*, Q2*d* of the first and the second hydraulic actuators 4, 7 become less than the maximum discharge flow rate Qmax per pump.

In addition, after dumping the earth from the hydraulic pressure shovel to the dump truck, when conducting "down rotation operation", which returns the bucket to the excavation position, the complex operations of rotating the upper rotational body and lowering the boom are conducted. The return rotational operation is an operation conducted at less than the maximum discharge flow rate Qmax per pump; the operation of lowering the boom requires lower load pressure; and the necessary flow rate is low and adequate, at a level that does not reduce the load pressure in the hydraulic actuator 7. Moreover, if adopting a hydraulic pressure reproduction circuit, which reuses pressure oil discharged from the first and the second hydraulic actuators 4, 7 to a tank, the necessary flow rate is enough at less than the maximum discharge flow rate Qmax per pump.

Switching the first merging/separating valve 13 and the second merging/separating valve 21 from the merge position A to the separation position B is conducted by the processing of S4 to S10 described below.

The controller 14 outputs control signals to the first and the second merging/separating valves 13, 21 such that, after the operation of switching the first merging/separating valve 13 from the merge position A to the separation position B has first been conducted and the switching of the first merging/separating valve 13 has been completed, the operation of switching the second merging/separating valve 21 from the merge position A to the separation position B is conducted. This is done in order to control fluctuations of the flow rate occurring before and after switching the merging/separating valves 13, 21 by firstly separating the first and the second discharge fluid passages 10, 11 and then continuing to separate the first and the second load pressure introduction fluid passages 16, 19 to, when switching to the separation position, keep functioning the pressure compensation during merging as much as possible.

Figure 3A:
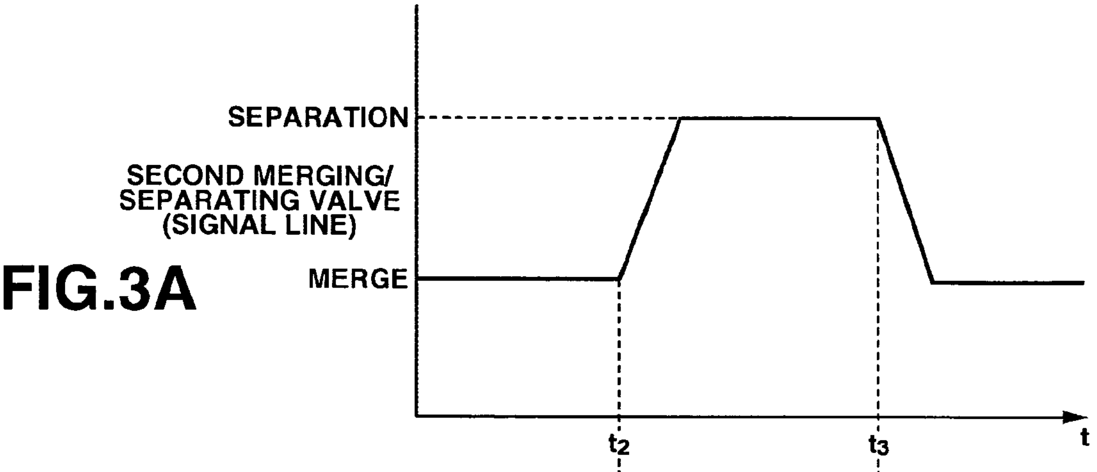
FIGS. 3A and 3B are time charts of the switching operation of the second merging/separating valve, and of the switching operation of the first merging/separating valve respectively.
Figure 3B:
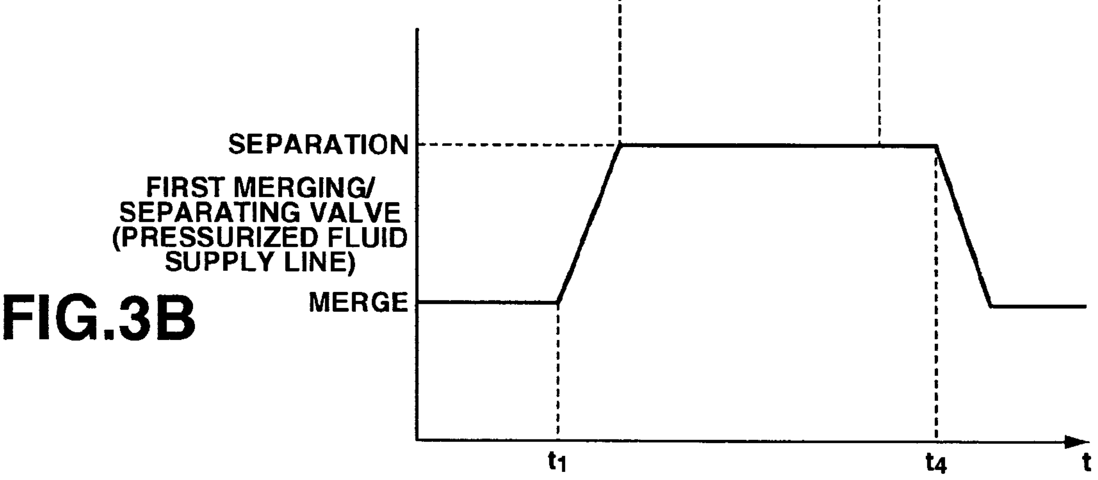

That is to say, as indicated in FIG. 3B, firstly the operation to switch the first merging/separating valve 13 from the merge position A to the separation position B, specifically, the operation to close the connection passage 12, is begun at time t1 (S4).

The operation to switch the first merging/separating valve 13 from the merge position A to the separation position B, specifically, the operation to close the first merging/separating valve 13, is conducted (S4 to S8) such that the spool moves from the open position A to the closed position B over a specified time (for example, 0.3 to 0.5 sec) following the modulation curve indicated in FIG. 3B.

Figure 4A:
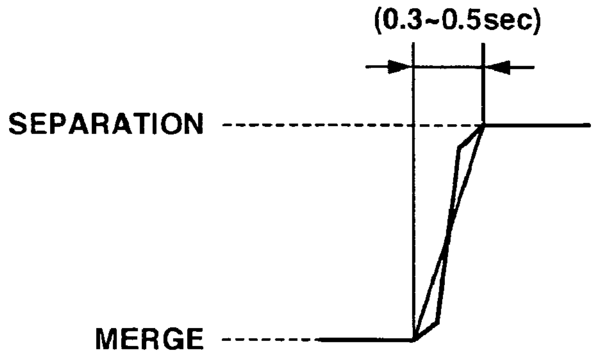
FIGS. 4A, 4B, and 4C are diagrams indicating examples of modulation curves during the switching operations of the first and the second merging/separating valves.
Figure 4B:
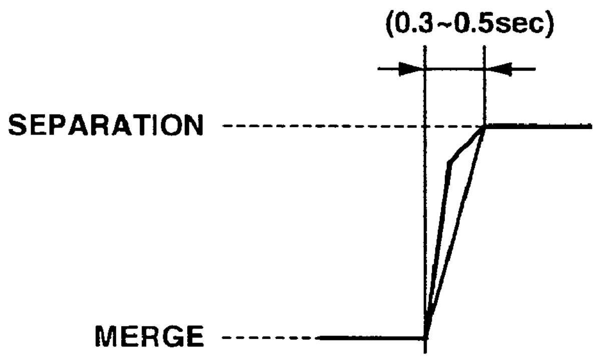
Figure 4C:
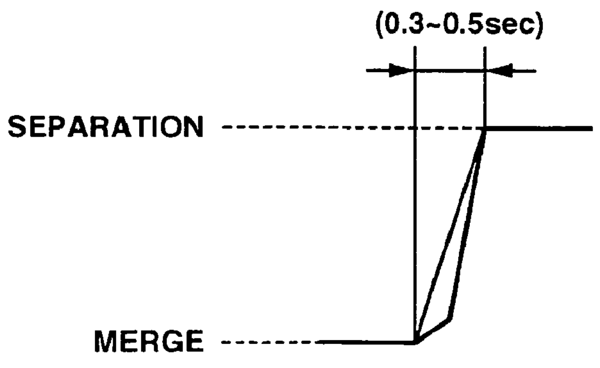

The modulation curve of the closing operation of the first merging/separating valve 13 may also be like the examples indicated in FIGS. 4A, 4B, and 4C.

During the operation to close the first merging/separating valve 13, the controller 14 controls the swash plates 2*a*, 3*a* of the first and the second hydraulic pumps 2, 3 based on the detected pressures P1*p*, P2*p* of the pressure sensors 27, 28.

The flow rate differential Q1*p*–Q2*p* of the discharge flow rates Q1*p*, Q2*p* (L/min) of the first and the second hydraulic pumps 2, 3 are calculated based on the detected pressures P1*p*, P2*p* of the pressure sensors 27, 28 to determine whether or not the discharge flow rate Q1*p* of the first hydraulic pump 2 is greater than the discharge flow rate Q2*p* of the second hydraulic pump 3 (S5).

If determined (determination of YES at S5) that the discharge flow rate Q1*p* of the first hydraulic pump 2 is greater than the discharge flow rate Q2*p* of the second hydraulic pump 3, control signals are output to the servo mechanisms 25, 26 such that the discharge flow rate Q1*p* of the first hydraulic pump 2 is gradually increased by the specified micro-flow rate ΔQ1*p* at each step, as the discharge flow rate Q2*p* of the second hydraulic pump 3 is gradually decreased by the specified micro-flow rate ΔQ2*p* at each step. The increase in the discharge flow rate of the first hydraulic pump 2 and the decrease of the discharge flow rate of the second hydraulic pump 3 is conducted until reaching the required flow rates Q1*d*, Q2*d* of the first and the second hydraulic actuators 4, 7 calculated at S3 above. Here, the maximum value of the discharge flow rate increase is up to the maximum discharge flow rate Qmax (maximum swash plate rotation position) of the hydraulic pump 2 (S6).

Meanwhile, if determined (determination of NO at S5) that the discharge flow rate Q1*p* of the first hydraulic pump 2 is equal to or less than the discharge flow rate Q2*p* of the second hydraulic pump 3, control signals are output to the servo mechanisms 25, 26 such that the discharge flow rate Q1*p* of the first hydraulic pump 2 is gradually decreased by the specified micro-flow rate ΔQ1*p* at each step, as the discharge flow rate Q2*p* of the second hydraulic pump 3 is gradually increased by the specified micro-flow rate ΔQ2*p* at each step. The decrease in the discharge flow rate of the first hydraulic pump 2 and the increase of the discharge flow rate of the second hydraulic pump 3 is conducted until reaching the required flow rates Q1*d*, Q2*d* of the first and the second hydraulic actuators 4, 7 calculated at S3 above. Here, the maximum value of the discharge flow rate increase is up to the maximum discharge flow rate Qmax (maximum swash plate rotation position) of the hydraulic pump 3 (S7).

Next, the program determines (S8) whether or not the switching operation (closing operation) of the first merging/separating valve 13 to the separation position B has been completed.

If the switching operation (closing operation) of the first merging/separating valve 13 to the separation position B has not been completed (determination of NO at S8), processing returns to S4, and the operation (closing operation) to switch the first merging/separating valve 13 to the separation position B is continued (S4); but if switching operation (closing operation) of the first merging/separating valve 12 to the separation position B has been completed (determination of YES at S8), processing moves to the next step S9, and the switching operation (closing operation) of the second merging/separating valve 21 from the merge position A to the separation position B is begun (S9).

As indicated in FIG. 3A, the operation (closing operation) to switch the second merging/separating valve 21 from the merge position A to the separation position B is begun at time t2, which is a specified time later than the switching operation start time t1 of the first merging/separating valve 13. Then, in the same way as with the first merging/separating valve 13, the switching operation of the second merging/separating valve is conducted (S9 to S10) such that the spool is moved up to the close position B over a specified time (for example, 0.3 to 0.5 sec) following the modulation curve indicated in FIG. 3A.

The modulation curve of the closing operation of the second merging/separating valve 21 may also be like the examples indicated in FIGS. 4A, 4B, and 4C.

Whether or not the switching operation (closing operation) of the second merging/separating valve 21 to the separation position B has been completed is determined (S10), and if the switching operation (closing operation) of the second merging/separating valve 21 to the separation position B has not been completed (determination of NO at S10), processing returns to S9, and the operation (closing operation) to switch the second merging/separating valve 21 to the separation position B is continued (S9); but if switching operation (closing operation) of the second merging/separating valve 21 to the separation position B has been completed (determination of YES at S10), processing returns to the step S1, and once again it is determined whether or not the traveling operation lever is OFF, and the same processing is repeated and executed.

When the second merging/separating valve 21 is positioned at the separation position B, pressure compensation is released.

When the second merging/separating valve 21 is positioned at the separation position B, the first load pressure introduction fluid passage 16 and the second pressure introduction fluid passage 19 are blocked, and the load pressure introduction fluid passage 24 and the inlet port of the shuttle valve 22 are also blocked. The load pressure P1 is thereby independently applied to the second receiving pressure unit 6*b* of the first pressure compensation valve 6 through the load pressure introduction fluid passage 23, the shuttle valve 22, the first load introduction fluid passage 16, and the shuttle valve 15. As a result, the load pressure of the outlet port side of the first main operation valve 5 maintains the load pressure P1 independently.

Meanwhile, the load pressure P2 is independently applied to the second receiving pressure unit 9*b* of the second pressure compensation valve 9 through the load pressure introduction fluid passage 24, the connecting passage 21*b* of the second merging/separating valve 21, the second load introduction fluid passage 19, and the shuttle valve 18. As a result, the load pressure of the outlet port side of the second main operation valve 8 maintains the load pressure P2 independently.

According to the present embodiment described above, the flow rate fluctuations before and after switching the first and the second merging/separating valves 13, 21 are suppressed because the pressure compensation during merging is conducted as continuously as possible when switching to the separation position, such that the operation (closing operation) to switch the second merging/separating valve 21 to the separation position B is begun after the operation (closing operation) to switch the first merging/separating valve 13 to the separation position B has been completed. Operability is thereby improved, and work efficiency is improved.

Meanwhile, if at least one of the calculated necessary flow rates Q1*d*, Q2*d* of the first and the second hydraulic actuators 4, 7 is determined to be the maximum discharge flow rate Qmax or more per pump of the first and the second pumps 2, 3 (determination of NO at S3), then the separation state should be changed to the merge state, and the processing moves to step S11. Specifically, if at least one of the calculated necessary flow rates Q1*d*, Q2*d* of the first and the second hydraulic actuators is determined to be the maximum discharge flow rate Qmax or more per pump of the first and the second pumps 2, 3, the flow rate to be supplied to the hydraulic actuators 4, 7 is not adequate with just the maximum discharge flow rate of the one corresponding hydraulic pump, and it is necessary to supply the first and the second hydraulic actuators 4, 7 by merging the discharge flow rates of the first and the second hydraulic pumps 2, 3 in order to secure sufficient operation speed of the first and the second hydraulic actuators 4, 7 and to avoid provoking a drop in work efficiency.

The situation of changing from the separation state to the merge state in this way may, for example, be when combining the boom raising operation and the arm operation.

Switching the first merging/separating valve 13 and the second merging/separating valve 21 from the separation position B to the merge position A is conducted by the processing of S11 to S14 described below.

The controller 14 outputs control signals to the first and the second merging/separating valves 13, 21 such that, after the operation of switching the second merging/separating valve 21 from the separation position B to the merge position A has been conducted first and the switching of the second merging/separating valve 21 has been completed, the operation of switching the first merging/separating valve 13 from the separation position B to the merge position A is conducted. This is done in order to control fluctuations of the flow rate occurring before and after switching the merging/separating valves 13, 21 by first merging the first and the second load pressure introduction fluid passages 16, 19 and then continuing to merge the first and the second discharge fluid passages 10, 11 to, when switching to merge, keep functioning the pressure compensation during merging as much as possible.

Specifically, as indicated in FIG. 3A, firstly the operation to switch the second merging/separating valve 21 from the separation position B to the merge position A is begun at time t3 (S11).

The operation to switch the second merging/separating valve 21 from the separation position B to the merge position A, specifically, the operation to open the second merging/separating valve 21, is conducted (S11 to S12) such that the spool moves from the closed position B to the open position A over a specified time (for example, 0.3 to 0.5 sec) following the modulation curve indicated in FIG. 3A.

The modulation curve of the opening operation of the second merging/separating valve 21 may also be like the examples indicated in FIGS. 4A, 4B, and 4C.

The program determines (S12) whether or not the switching operation (opening operation) of the second merging/separating valve 13 to the merge position B has been completed, and if the switching operation (opening operation) of the second merging/separating valve 21 to the merge position A has not been completed (determination of NO at S12), processing returns to S11, and the operation (opening operation) to switch the second merging/separating valve 21 to the merge position A is continued (S11); but if switching operation (opening operation) to switch the second merging/separating valve 21 to the merge position A has been completed (determination of YES at S12), processing moves to the next step S13, and the switching operation (opening operation) of the first merging/separating valve 13 from the separation position B to the merge position A is begun (S13).

As indicated in FIG. 3B, the operation (opening operation) to switch the first merging/separating valve 13 from the separation position B to the merge position A is begun at time t4, which is a specified time later than the switching operation start time t3 of the second merging/separating valve 21. Then, in the same way as with the second merging/separating valve 21, the switching operation of first merging/separating valve is conducted (S13 to S14) such that the spool is moved up to the open position A over a specified time (for example, 0.3 to 0.5 sec) following the modulation curve indicated in FIG. 3B.

The modulation curve of the opening operation of the first merging/separating valve 13 may also be like the examples indicated in FIGS. 4A, 4B, and 4C.

Whether or not the switching operation (opening operation) of the first merging/separating valve 13 to the merge position A has been completed is determined (S14), and if the switching operation (opening operation) of the first merging/separating valve 13 to the merge position A has not been completed (determination of NO at S14), processing returns to S13, and the operation (opening operation) to switch the first merging/separating valve 13 to the merge position A is continued (S13); but if switching operation (opening operation) of the first merging/separating valve 13 to the merge position A has been completed (determination of YES at S14), processing returns to the step S1, and once again it is determined whether or not the traveling operation lever is OFF, and the same processing is repeated and executed.

According to the present embodiment described above, the flow rate fluctuations before and after switching the first and the second merging/separating valves 13, 21 are suppressed because the pressure compensation during merging is conducted as continuously as possible when switching to the merge position, such that the operation (opening operation) to switch the first merging/separating valve 13 to the merge position A is begun after the operation (opening operation) to switch the second merging/separating valve 21 to the merge position A has been completed. Operability is thereby improved, and work efficiency is improved.

Further, when conducting the operation (opening operation) to switch the first merging/separating valve 13 from the separation position B to the merge position A (S13, S14), the rotational positions of the swash plates 2*a*, 3*a* of the first and the second hydraulic pumps 2, 3 may be controlled in the same way as the control (S5, S6, S7) when conducting the switching operation (closing operation) of the first merging/separating valve 13 from the merge position A to the separation position B.

As described above, the present embodiment improves operability and work efficiency by suppressing flow rate fluctuations occurring in the first and the second discharge fluid passages 10, 11 before and after switching the merging/separating valves 13, 21 because when switching from the merge position to the separation position, pressure compensation is turned OFF after blocking the first and the second discharge fluid passages 10, 11; and when switching from the separation position to the merge position, the first and the second discharge fluid passages 10, 11 are connected after turning pressure compensation ON.

Moreover, the present embodiment improves energy efficiency and work efficiency when conducting complex operations of a plurality of work devices (a plurality of hydraulic actuators 4, 7) by accurately determining the time for switching the merging/separating valves 13, 21 and suppressing energy loss caused by pressure loss of the pressure compensation valves 6, 9 because the necessary flow rates Q1*d*, Q2*d* of the first and the second hydraulic actuators 4, 7 are calculated, and whether to switch to the separation position or to the merge position is determined corresponding to whether or not the necessary flow rates Q1*d*, Q2*d* are less than the maximum discharge flow rate Qmax per pump of the first and the second hydraulic pumps 2, 3.

Further, the delay time t2–t1 from time t1 that begins the switching of the first merging/separating valve 13 to time t2 that begins the switching of the second merging/separating valve 21, or the delay time t4–t3 from time t3 that begins the switching of the second merging/separating valve 21 to time t4 that begins the switching of the first merging/separating valve 13 may both be set to the same or different times. Moreover, the above delay times t2–t1 and t4–t3 may differ for each type of work device (hydraulic actuator). In addition, the same modulation curve or suitable differing modulation curves may be used for each case when: switching the first merging/separating valve 13 from the merge position A to the separation position B; switching the first merging/separating valve 13 from the separation position B to the merge position A; switching the second merging/separating valve 21 from the merge position A to the separation position B; and switching the second merging/separating valve 21 from the separation position B to the merge position A.

Moreover, in the present embodiment, the first and the second discharge fluid passages 10, 11 were each provided with pressure sensors 27, 28, and the flow rate differential Q1*p*–Q2*p* of the first and the second discharge fluid passages 10, 11 were calculated based on the detected pressures of these pressure sensors 27, 28, but the sensors for calculating the flow rate differential Q1*p*–Q2*p* may be sensors that are not pressure sensors. For example, the first and the second discharge fluid passages 10, 11 may be provided with differential pressure sensor, and the flow rate differential Q1*p*–Q2*p* may be calculated based on the detection of this differential pressure sensor; or the first and the second discharge fluid passages 10, 11 may each be provided with flow rate sensors that detect the amounts Q1*p*, Q2*p* of pressure oil that flow through the first and the second discharge fluid passages 10, 11, and the flow rate differential Q1*p*–Q2*p* may be calculated based on the detected flow rates Q1*p*, Q2*p* of the flow rate sensors.

Figure 6:
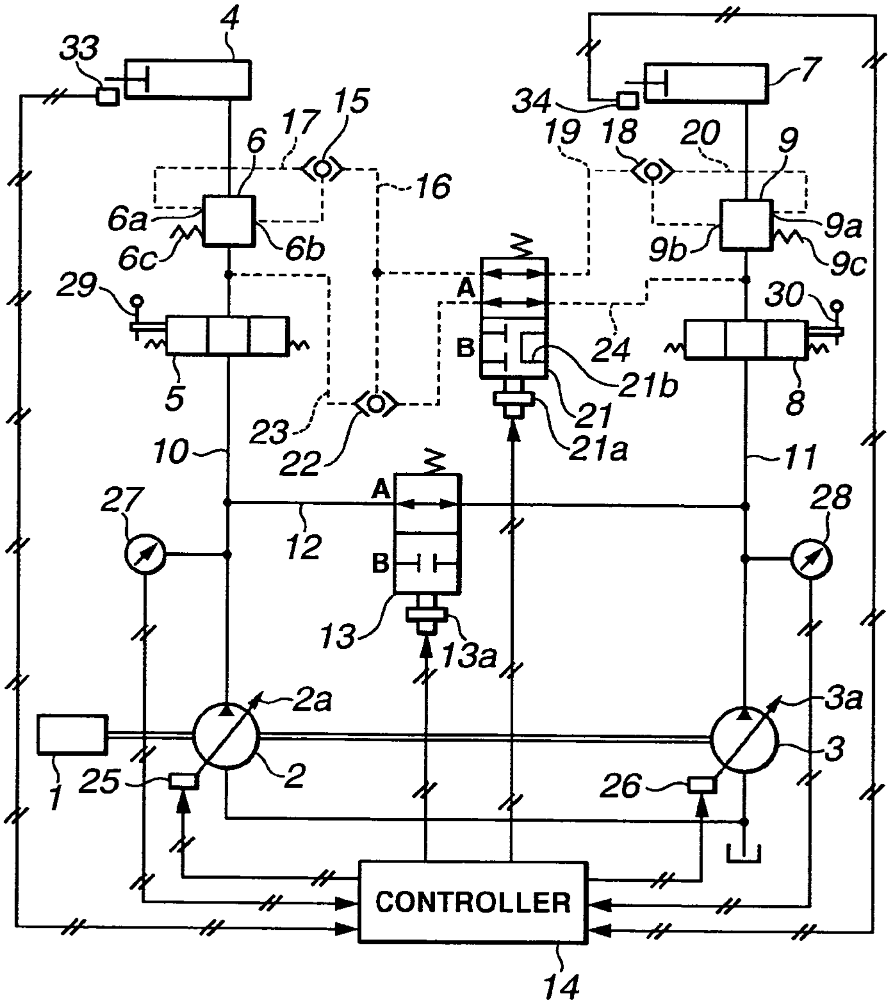
FIG. 6 is a hydraulic circuit diagram indicating a variation of FIG. 1.

In the present embodiment, the necessary flow rates Q1*d*, Q2*d* of the first and the second hydraulic actuators 4, 7 are calculated based on the operation amounts S1, S2 of the operation levers 29, 30, but as indicated in FIG. 6, the first and the second hydraulic actuators (hydraulic pressure cylinders) 4, 7 may be provided respectively with stroke amount detection sensors 33, 34 that detect the amount of stroke of the rods of the first and the second hydraulic actuators 4, 7, and the Q1*d*, Q2*d* of the first and the second hydraulic actuators 4, 7 may be calculated based on the amounts of stroke detected by these stroke amount sensors 33, 34.

The present embodiment assumed that the construction machine was a crawler track type hydraulic pressure shovel, and when a traveling operation lever was ON (determination of NO at S1) the travel logic (S21 to S23) should be executed, and control of the present embodiment (S3 to S14) should not be executed irrespective of the necessary flow rates Q1*d*, Q2*d* of the first and the second hydraulic actuators 4, 7; but the present invention may be applied to a construction machine other than crawler track type hydraulic pressure shovels, or control of the present invention may also be executed even when the traveling operation levers are ON.

Figure 2:
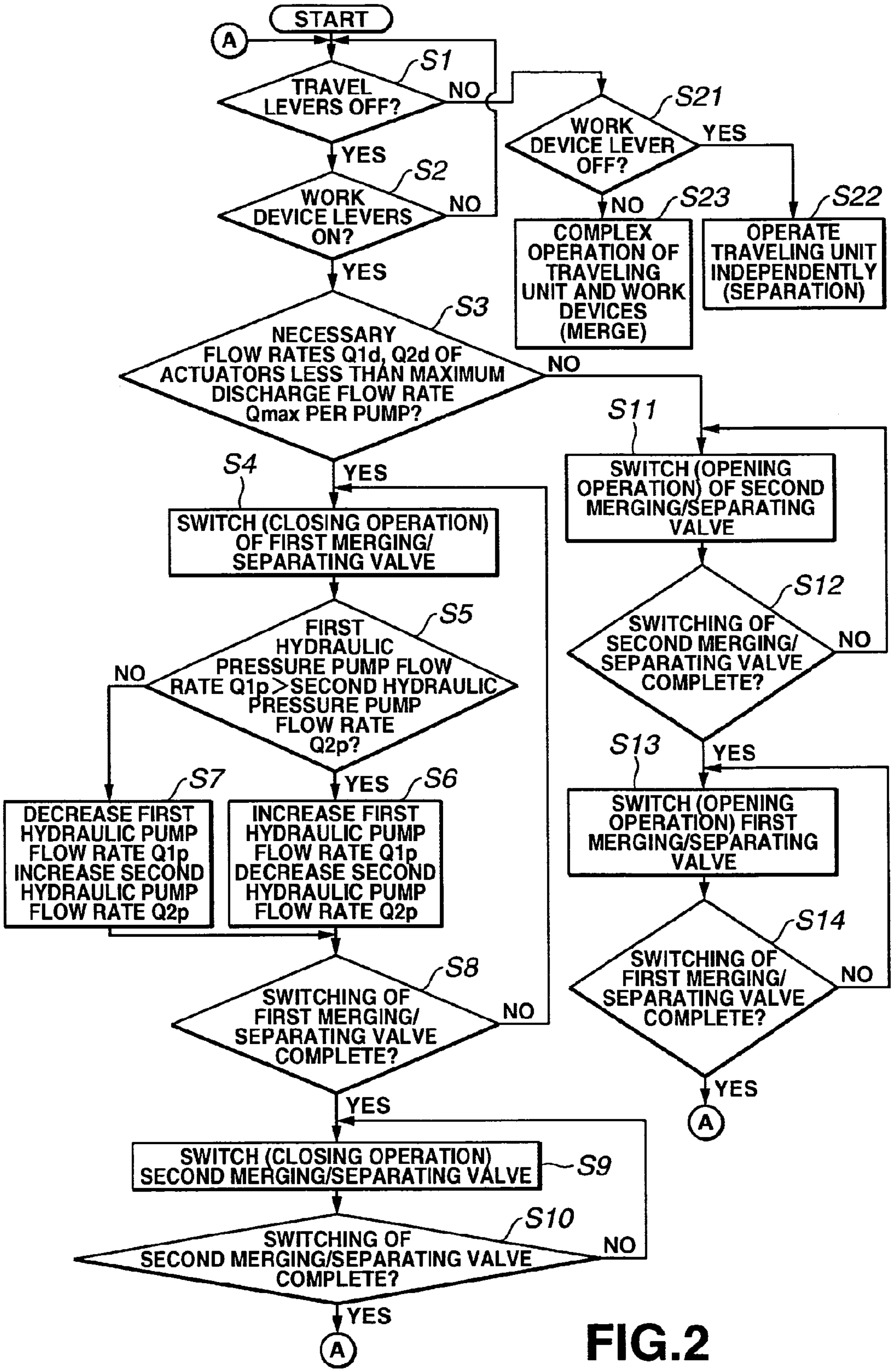
FIG. 2 is a flow chart indicating a description of the processing performed by the controller indicated in FIG. 1.

For example, the present invention may be applied to construction machines with wheels, for example, a wheel loader, and the processing of S1 and the travel logic (S21 to S23) in the flow chart of FIG. 2 may be omitted, and processing may move to the control of the present invention (S3 to S14) corresponding to whether or not the work device operation levers have been manipulated (S2).

The invention claimed is

1. A hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate each differential pressure before and after the first and the second main operation valves to each predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, and control means that controls a switching of the first and the second merging/separating valves such that, when it is determined that the first merging/separating valve and the second merging/separating valve are to be switched from the merge position to the separation position, an operation of a switching of the first merging/separating valve from the merge position to the separation position is performed initially, and after the switching of the first merging/separating valve has been completed, an operation to switch the second merging/separating valve from the merge position to the separation position is performed.

2. The hydraulic pressure control device of a construction machine according to claim 1, wherein the control means controls the switching of the first and the second merging/separating valves such that, when it is determined that the first merging/separating valve and the second merging/separating valve are to be switched from the separation position to the merge position, an operation of a switching of the second merging/separating valve from the separation position to the merge position is performed initially, and after the switching of the second merging/separating valve has been completed, an operation to switch the first merging/separating valve from the separation position to the merge position is performed.

3. A hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate each differential pressure before and after the first and the second main operation valves to each predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means for determining whether each of the necessary flow rates of the first and the second hydraulic actuators calculated by the necessary flow rate calculation means is less than a maximum discharge flow rate per pump of the first and the second variable displacement hydraulic pumps, and control means that controls a switching of the first and the second merging/separating valves such that, when the first merging/separating valve and the second merging/separating valve are in the merge position and the determination means determines that each of the necessary flow rates of the first and the second hydraulic actuators is less than the maximum discharge flow rate per pump of the first and the second variable displacement hydraulic pumps, an operation of a switching of the first merging/separating valve from the merge position to the separation position is performed initially, and after the switching of the first merging/separating valve has been completed, an operation to switch the second merging/separating valve from the merge position to the separation position is performed.

4. The hydraulic pressure control device of a construction machine according to claim 3, wherein the control means controls the switching of the first and the second merging/separating valves such that, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps, an operation of a switching of the second merging/separating valve from the separation position to the merge position is performed initially, and after the switching of the second merging/separating valve has been completed, an operation to switch the first merging/separating valve from the separation position to the merge position is performed.

5. A hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate each differential pressure before and after the first and the second main operation valves to each predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means for determining whether each of the necessary flow rates of the first and the second hydraulic actuators calculated by the necessary flow rate calculation means is less than a maximum discharge flow rate per pump of the first and the second variable displacement hydraulic pumps, and control means that controls a switching of the first merging/separating valve and the second merging/separating valve from the merge position to the separation position, when the first merging/separating valve and the second merging/separating valve are in the merge position and the determination means determines that each of the necessary flow rates of the first and the second hydraulic actuators is less than the maximum discharge flow rate per pump of the first and the second variable displacement hydraulic pumps.

6. The hydraulic pressure control device of a construction machine according to claim 5, wherein the control means performs control to switch the first merging/separating valve and the second merging/separating valve from the separation position to the merge position, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps.

7. A hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate each differential pressure before and after the first and the second main operation valves to each predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, and control means that controls a switching of the first and the second merging/separating valves such that, when it is determined that the first merging/separating valve and the second merging/separating valve are to be switched from the separation position to the merge position, an operation of a switching of the second merging/separating valve from the separation position to the merge position is performed initially, and after the switching of the second merging/separating valve has been completed, an operation to switch the first merging/separating valve from the separation position to the merge position is performed.

8. A hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate each differential pressure before and after the first and the second main operation valves to each predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means for determining whether each of the necessary flow rates of the first and the second hydraulic actuators calculated by the necessary flow rate calculation means is less than a maximum discharge flow rate per pump of the first and the second variable displacement hydraulic pumps, and control means that controls a switching of the first and the second merging/separating valves such that, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps, an operation of a switching of the second merging/separating valve from the separation position to the merge position is performed initially, and after the switching of the second merging/separating valve has been completed, an operation to switch the first merging/separating valve from the separation position to the merge position is performed.

9. A hydraulic pressure control device of a construction machine, comprising:

first and second variable displacement hydraulic pumps, first and second hydraulic actuators driven by being supplied with pressure oil discharged from the first and the second variable displacement hydraulic pumps, first and second main operation valves that switch directions and flow rates of the pressure oil supplied to the first and the second hydraulic actuators, first and second discharge fluid passages that connect discharge ports of the first and the second variable displacement hydraulic pumps with the first and the second main operation valves, first and second pressure compensation valves that compensate each differential pressure before and after the first and the second main operation valves to each predetermined value, a first merging/separating valve that switches between a merge position, which makes a connection between the first discharge fluid passage and the second discharge fluid passage, and a separation position, which blocks between the first discharge fluid passage and the second discharge fluid passage, maximum load pressure detection means that detects maximum load pressure among load pressures of the first and the second hydraulic actuators, first and second load pressure introduction fluid passages that introduce load pressure to the first and the second pressure compensation valves, a second merging/separating valve that switches between a merge position, which introduces pressure oil with the maximum load pressure as detected by the maximum load pressure detection means to the first and the second load pressure introduction fluid passages, and a separation position, which introduces the load pressures of the first and the second hydraulic actuators to the corresponding first and second load pressure introduction fluid passages respectively, necessary flow rate calculation means that calculates necessary flow rates to be supplied to the first and the second hydraulic actuators, determination means for determining whether each of the necessary flow rates of the first and the second hydraulic actuators calculated by the necessary flow rate calculation means is less than a maximum discharge flow rate per pump of the first and the second variable displacement hydraulic pumps, and control means that controls a switching of the first merging/separating valve and the second merging/separating valve from the separation position to the merge position, when the first merging/separating valve and the second merging/separating valve are in the separation position and the determination means determines that at least one of the necessary flow rates of the first and the second hydraulic actuators is the maximum discharge flow rate or more per pump of the first and the second variable displacement hydraulic pumps.

* * * * *